United States Patent [19]
Mullet et al.

[11] Patent Number: 5,913,802
[45] Date of Patent: Jun. 22, 1999

[54] SINGLE LEVER DRIVEWHEEL STEERING POWER LAWN MOWER

[75] Inventors: Paul W. Mullet, Hesston; Elmer D. Voth, Newton; Royce A. Steinert, Moundridge; Harlan J. Bartel, Newton, all of Kans.

[73] Assignee: Excel Industries, Inc., Hesston, Kans.

[21] Appl. No.: 08/870,783

[22] Filed: Jun. 6, 1997

[51] Int. Cl.$^6$ ............................. A01D 34/64; A01D 34/82
[52] U.S. Cl. ............................. 56/10.8; 56/10.9; 56/11.1; 56/11.4; 56/11.8; 180/19.3; 180/6.48
[58] Field of Search ................................ 56/10.8, 10.2 R, 56/10.9, 11.1, 11.2, 11.4, 11.8, 11.9, 14.7; 180/19.1, 19.3, 6.48, 6.32, 6.6

[56] References Cited

U.S. PATENT DOCUMENTS

| | | | |
|---|---|---|---|
| 4,395,865 | 8/1983 | Davis, Jr. et al. | 56/11.8 X |
| 4,914,592 | 4/1990 | Callahan et al. | 180/6.48 X |
| 5,131,483 | 7/1992 | Parkes | 180/6.48 |
| 5,644,903 | 7/1997 | Davis, Jr. | 180/19.3 X |

FOREIGN PATENT DOCUMENTS

| 289 954 | 6/1965 | Netherlands | 56/11.8 |
|---|---|---|---|

*Primary Examiner*—Terry Lee Melius
*Attorney, Agent, or Firm*—Edward L. Brown, Jr.

[57] ABSTRACT

The invention is a self-propelled drivewheel steering power mower which can be operated in a standing or sitting position, including a pair of variable flow hydrostatic pumps with tiltable swash plates, each of which drives one of a pair of drivewheels. A vertically mounted steering shaft is rotatably supported on the mower for rotation about an axis concentric with said shaft; and a T-shaped steering handle bar is rotatably journaled to the end of said steering shaft for twisting about an axis concentric with said handle bar. A first pair of connecting rods connects the steering shaft to the swash plate of each variable flow pump whereby rotation of the steering shaft in one direction will increase the flow rate to one of the variable flow pumps while decreasing the flow rate proportionately to the other variable flow pump to effect steering right or left; and a second connecting rod connects the steering handle bar to the first pair of connecting rods whereby twisting of the handle bar in one direction increases the flow rate proportionally to both variable flow pumps while twisting in the opposite direction decreases the flow rate proportionally to both variable flow pumps to effect acceleration and deceleration of the mower.

9 Claims, 6 Drawing Sheets

SINGLE LEVER DRIVEWHEEL STEERING POWER LAWN MOWER

FIELD OF THE INVENTION

This invention relates to drivewheel steering vehicles and more specifically to drivewheel steering lawn mowers and the steering and driving systems of that type of mower.

DISCUSSION OF THE PRIOR ART

Tractor-type power lawn mowers include two basic types of steering, the first being conventional vehicle steering wherein one set of wheels, either front or rear, are turned in unison through a steering wheel mechanism while the other set of wheels are usually the powered wheels which may include a differential device to prevent wheel skid during turns.

The second type of steering, which the present invention involves, is referred to as drivewheel steering whereby the two drivewheels are on fixed axles which do not turn but rather the turning is achieved by turning the two drivewheels at different speeds or in different directions for a very sharp turn or even a zero turn radius wherein the mower actually turns about the mid-point of the drivewheel axis. In drivewheel steering systems, the mower becomes much more maneuverable than conventional vehicle steering, and slow mowing speeds are conducive to this improved maneuverability.

Hydraulically powered drivewheel systems typically include a separate variable displacement hydraulic pump for each of the two drivewheels. These variable displacement pumps are typically of the axial piston type which include a tiltable swash plate which can vary the pump discharge rate from a zero flow, also referred to as neutral, up to a maximum flow or a reverse direction flow to a particular maximum. This variable flow rate takes the place of a transmission and a clutch. While conventional steering is easily accommodated by a steering wheel through a mechanical linkage, drivewheel steering systems, wherein flow rates to the wheel motors control the turning, are more difficult to adapt to a conventional steering wheel.

Drivewheel steering type mowers have typically been controlled by a pair of side-by-side levers which move forward and aft from a neutral position to achieve steering. A primary disadvantage of this type of steering system is that in either an acceleration or deceleration condition, the momentum of the operator and his arms on the control levers have a tendency to apply a reverse input control to the system, as for example when the operator pulls the two control rods aft in attempting to decelerate the mower, the forward momentum of the driver tends to move the levers in the reverse direction. Early non-hydraulic drivewheel steering systems included a pair of side by side levers, one lever for controlling the speed of each drivewheel. The levers could activate clutches or brakes for controlling the speed of the separate steering wheels. Designs which utilize a single lever control for controlling both the speed and turning have been available for many years, as typified in the patent to Boyer, U.S. Pat. No. 2,766,834. This patent teaches a single lever control for a walk-behind operator which moves forward for forward acceleration and is turned right or left through rotational movement of the control handle. The patent to Clemson, U.S. Pat. No. 2,818,699, also teaches an early single steering control which controls both turning and speed. However, it, like the last mentioned patent, does not provide a rigid steering shaft which does not move fore and aft.

The patent to Gilliem, U.S. Pat. No. 5,181,579, teaches a pair of handles for controlling the speed of each steering wheel. However, both of the handles are positioned for control movement in the fore and aft plane, which has the same disadvantage of the above-mentioned patents.

The patent to Braun, U.S. Pat. No. 3,891,042, teaches a single lever control on a twin hydrostatic unit wherein twisting of the handle about its longitudinal axis controls engine speed while forward and aft movement control the flow rate from the variable displacement pump, thus having the same disadvantage of the above-mentioned patents.

SUMMARY OF THE PRESENT INVENTION

While steering wheels on rigidly mounted steering shafts provide the same rigidity as the steering system of the present invention, they require more expensive and complex hydraulic control units to control a drivewheel steering system. The system of the present invention incorporates a rigid steering shaft rotatably journeled to the frame of the mower with a T-bar shaped handle bar which rotates the steering shaft about a vertical axis for turning signals to the two variable displacement pumps. The handle bar rotatably journeled to the end of said steering shaft is twisted about a horizontal axis to control the speed of the mower from a stationary neutral position or a reverse direction position. The handle bars are spring-bias to a straight ahead position of the steering shaft about a vertical axis.

With the lack of any fore and aft movement on the steering shaft to control the mower, the operator can be standing without the concern of a momentum effect on the controls.

To achieve straight-ahead movement of the mower to a certain velocity, the handle bar is twisted about a horizontal axis to a certain angular position, thus causing the mower to move forward in a straight line at a rate of speed determined by how far you twist the handle bar. To achieve turning, the handle bar and its connected steering shaft are slightly turned about a vertical axis to the right or the left which, due to its mechanical linkage with the pumps, increases the flow to one pump while decreasing the flow to the other to achieve a turn. To return to straight-ahead movement, the handle bar is merely returned about the vertical axis, to its position normal with the track of the mower. To decrease the speed, to stop the mower, the handle bar is merely twisted backward in the opposite direction from that required when accelerating.

The mower also includes an electrical driver presence circuit which includes a switching device in the seat of the mower and as well in the foot pads of the mower on both sides whereupon the mower can be operated from either a standing or sitting position without killing the engine.

It is therefore the principle object of the present invention to provide a drivewheel steering power lawn mower with a single lever steering and driving control which has only rotational control input to a rigid steering shaft.

Another object of the present invention is to provide a single level mechanical steering and control system for a drivewheel steering system.

A further object of the present invention is to provide an operator presence system which functions with the operator either standing or sitting.

A further object of the present invention is to provide an approved drivewheel steering power mower which permits the operator to either sit or stand while operating the mower.

DESCRIPTION OF THE PREFERRED EMBODIMENT

Figure 1:
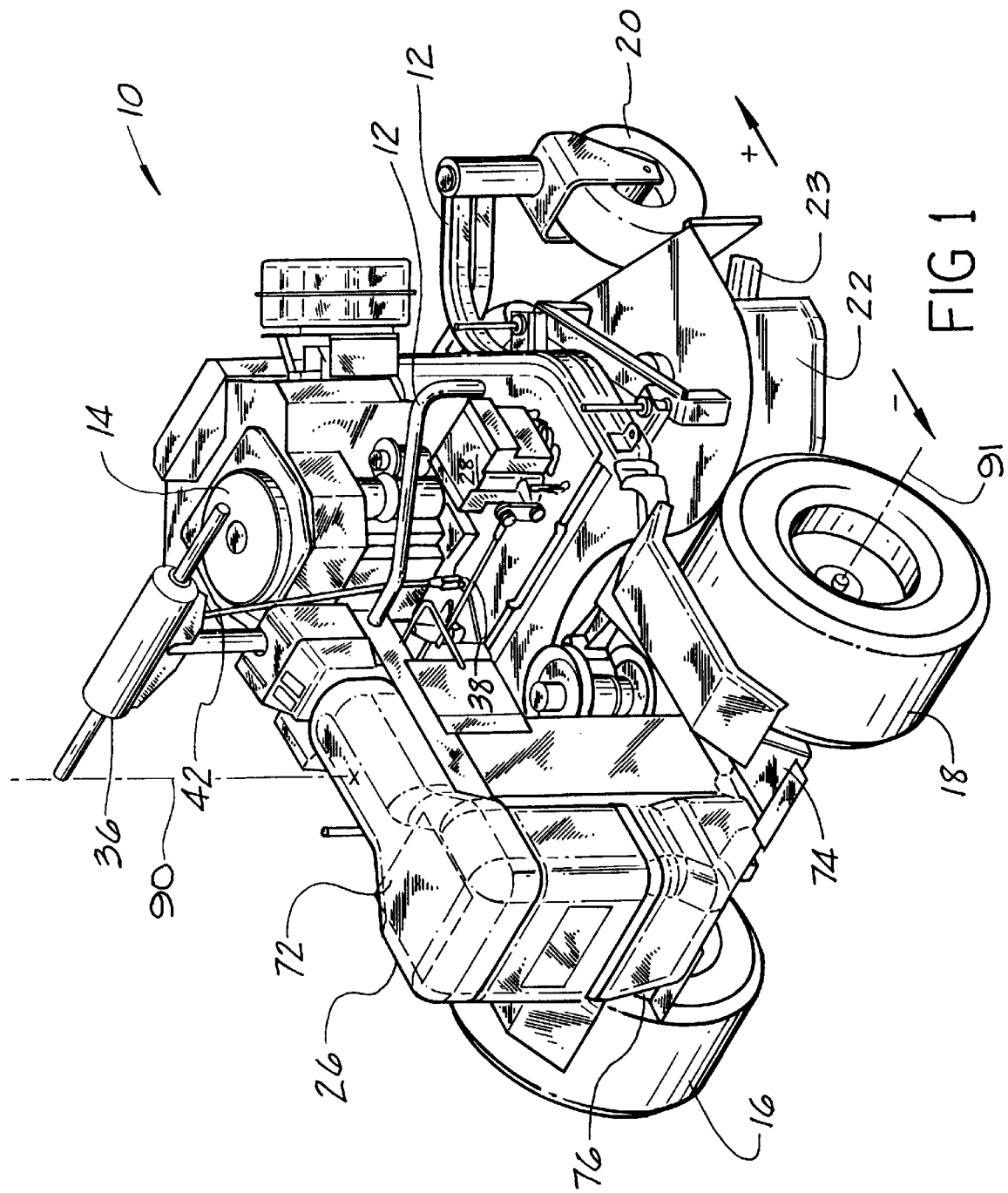
FIG. 1 is a right rear perspective view of the power mower of the present invention.
Figure 2:
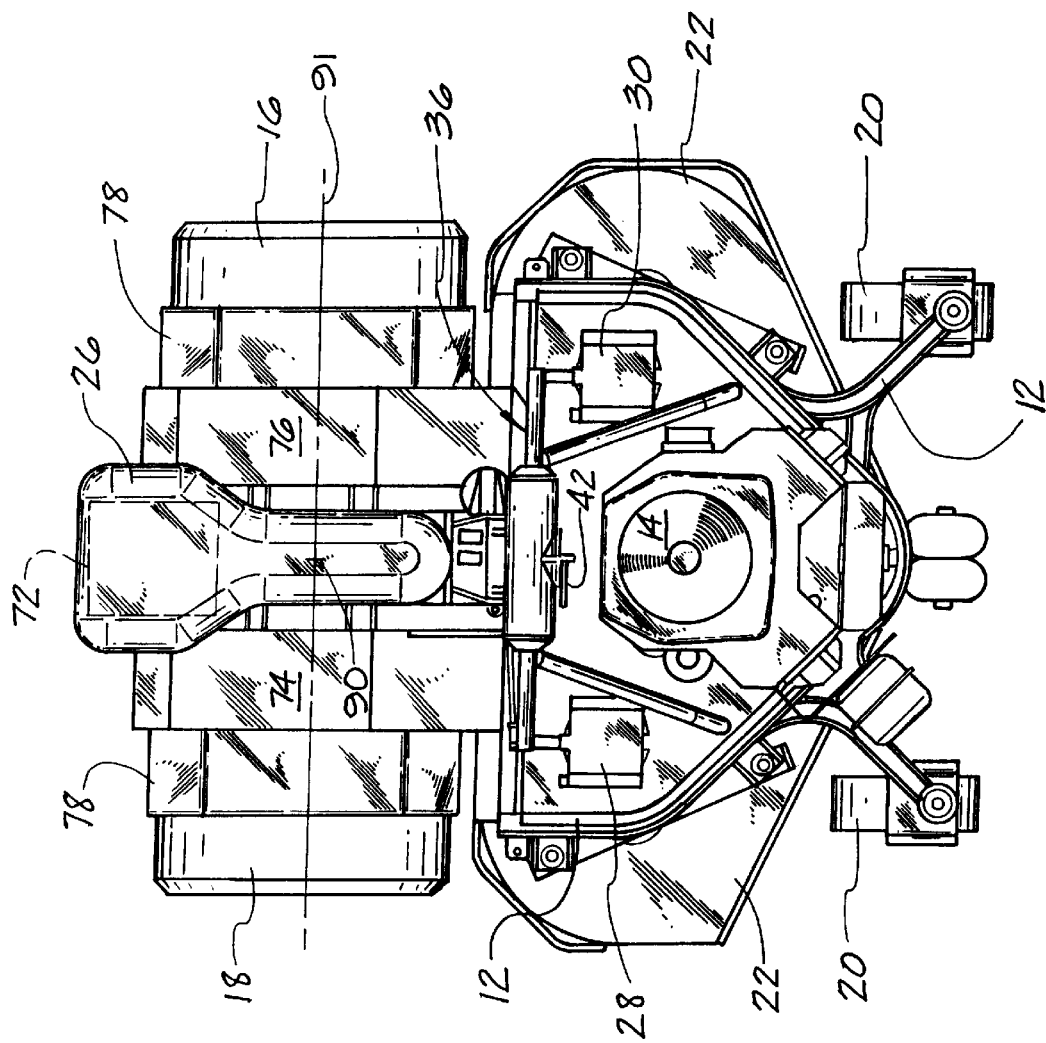
FIG. 2 is a top plan view of the mower.
Figure 3:
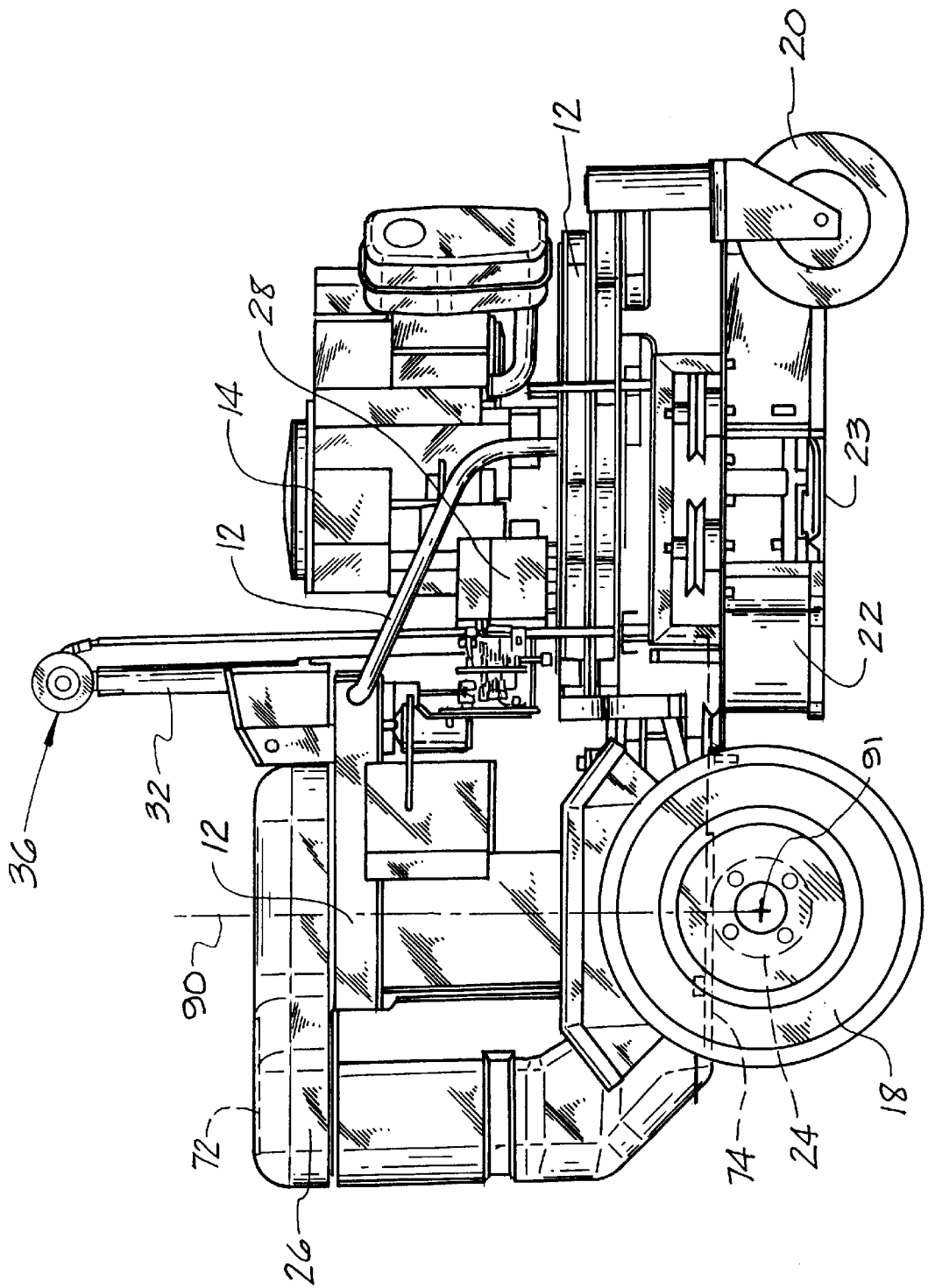
FIG. 3 is a right side elevational view of the mower.
Figure 4:
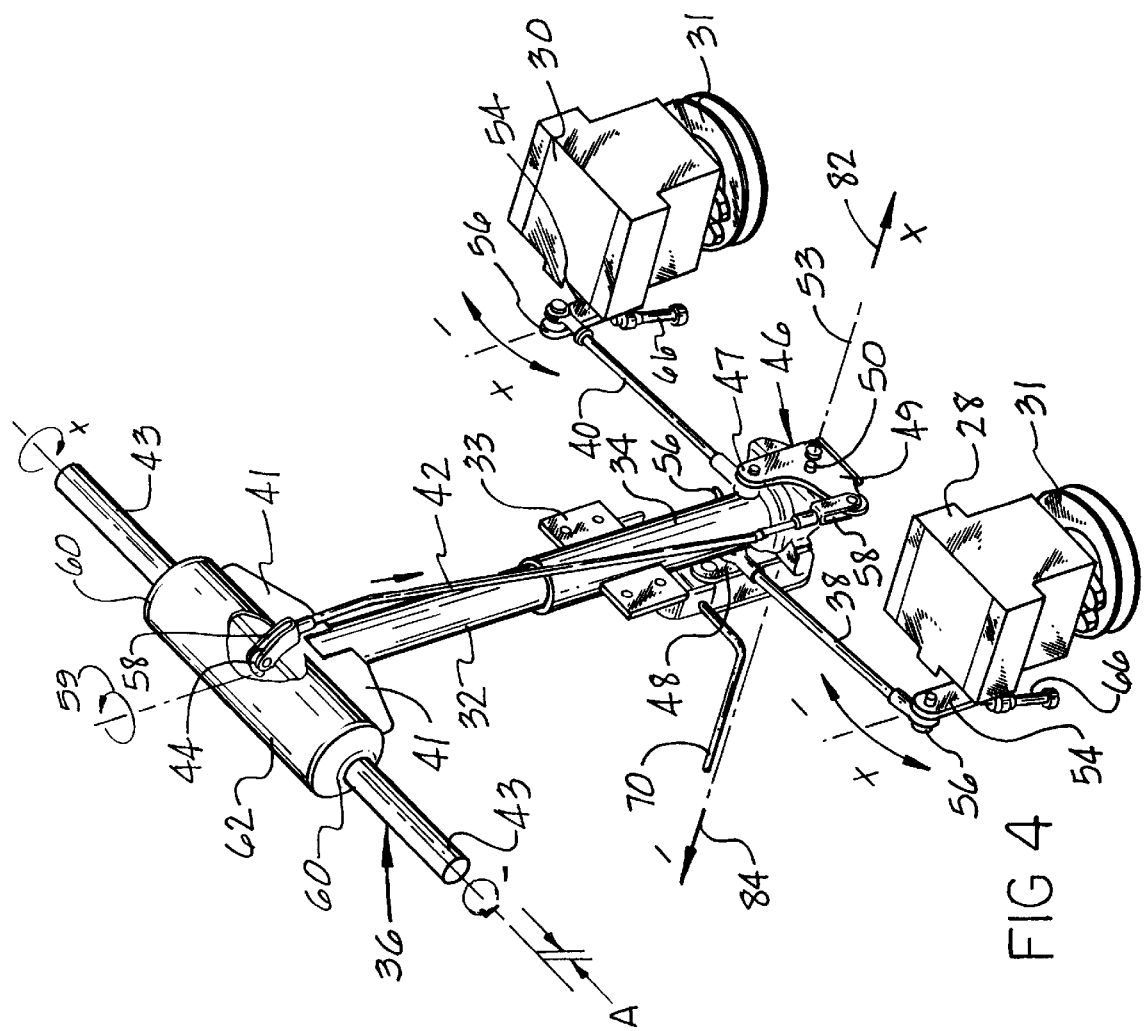
FIG. 4 is a perspective view of the steering and drive unit, including the two variable flow pumps.

Referring to FIG. 1, the tractor type power lawn mower of the present invention is generally described by reference numeral 10, as shown in FIGS. 1 through 3. The power mower includes frame 12 with an engine 14 positioned in front of a seat 26. Also attached to frame 12 are a pair of independently driven drivewheels 16 and 18 and a pair of castered wheels 20 pivotally attached to the front end of the frame 12. Positioned between the drivewheels and the front wheels is a conventional multi-blade cutting deck 22 which includes multiple rotating cutting blades 23 which are offset from each other in a conventional manner. Positioned behind engine 14 are a pair of variable flow positive displacement hydraulic pumps 28 and 30, as best seen in FIG. 2, which provide the hydraulic pressure for operating each of the drivewheels 18 and 16 respectively. Located inside each drivewheel 16 and 18 is a hydraulic low speed, high torque motor 24 which is symbolically shown in FIG. 3. Wheel motors of this type are common in the industry and are not shown in detail. Motor 24 on the right side of the tractor, as seen in FIG. 1, is hydraulically driven by pump 28 while pump 30 on the left side drives a similar hydraulic high torque motor 24, which is not shown in the drawing. Pumps 28 and 30 include pulleys 31 which are mounted on their respective drive shafts, as seen in FIG. 4, and are driven by V-belts, not shown, off the engine 14 in a conventional manner.

Figure 5:
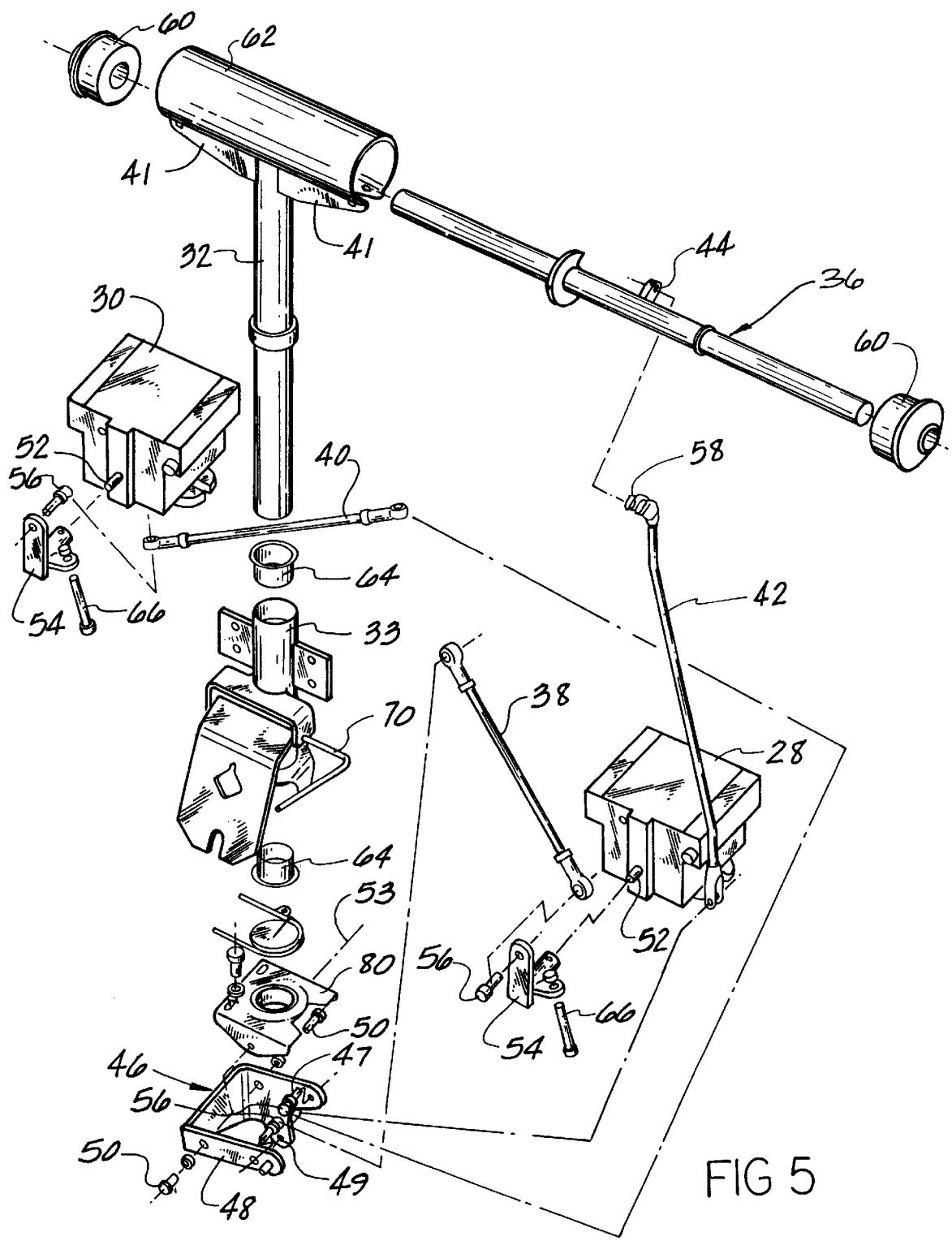
FIG. 5 is an exploded view of the various parts of the steering and drive unit shown in FIG. 4.

Mounted in the center of mower 10 is a vertically positioned steering shaft 32 which is mounted to the mower frame 12 through a bracket 33. Shaft 32 is rotatably journeled in a bearing sleeve 34 which is shown in detail in FIGS. 4 and 5 and includes two bearings 64, as shown in FIG. 5. Attached to the upper end of steering shaft 32 is a T-shaped handle bar 36 which is rotatably journaled in a pair of bearings 60 which in turn are supported by sleeve 62. Sleeve 62 in turn is rigidly attached to steering shaft 32 through a pair of gusset plates 41, as seen in FIG. 4. Handle bar 36 includes a pair of hand gripping portions 43 on the outer ends thereof. Connecting rod 42 is pivotally attached to lug 44 on handle bar 36 passing through an opening in sleeve 62.

Attached to the bottom of steering shaft 32 is a base plate 80, as seen in FIG. 5, which carries a yoke 46 which pivotally mounts to the base plate 80 through a pair of bolts allowing yoke 46 to rotate through limited angular movement while stroking the pumps 28 and 30. Yoke 46 includes three ears 47, 48 and 49 extending outwardly from its pivot axis 53. The first ear 48 is positioned on one side of bearing sleeve 34, as seen in FIG. 4, while ears 47 and 49 are located on the opposite side of bearing sleeve 34. Due to the opposite side on which ears 47 and 48 are placed, rotation of steering shaft 32 oppositely affects motor 28 from that of motor 30. Offset ear 47 controls the swash plate position of pump 30 via connecting rod 40 and pivot arm 54 which is connected to the swash plate shaft 52, as best seen in FIG. 5. Connecting rod 38 controls the flow rate of pump 28 through connecting rod 38 and pivot arm 54 which also is attached to swash plate shaft 52. Each variable flow pump 28 and 30 includes an adjustable limit stop 66 which limits the maximum stroke of the pump in one direction. Ear 49 on yoke 46 is pivotally connected to connecting rod 42 whereby twisting of handle bar 36 in a clockwise direction (+), as seen in FIG. 4, strokes both pumps 28 and 30 causing the mower to move in a forward direction, as indicated by arrow 82. Both ends of connecting rods 38 and 40 include ball joints 56 which are in turn pivotally connected to pivot arms 54 and ears 47 and 48 so as to prevent the linking structure from binding when steering shaft 32 is rotated. Mounted on bearing sleeve 34 is a locking arm 70 which pins yoke 46 in its neutral position, thereby preventing the mower from unintentionally shifting out of neutral. Connecting rod 42 includes a clevis 58 at its upper end which pivotally connects with lug 44 and a similar clevis 58 at its lower end which pivotally connects to ear 49.

Located inside seat 26 is a seat pad 72 which functions as an electric switch in an operator presence circuit. Also positioned on both sides of seat 26, as seen in FIG. 2, are a pair of foot pads 74 and 76 which also function as electric switches in the operator presence circuit. If any one of the three pads 72, 74 or 76 has pressure thereon, the operator presence circuit is satisfied and the mower will continue to operate. Since the mower can be operated by either a sitting or standing operator, the operator presence circuit is satisfied as long as any one of the three pads 72, 74 or 76 is compressed.

OPERATION

On initial startup of mower 10, the handle bar 36 and the yoke 46 are locked in a neutral position, (zero flow), as shown in FIG. 4. When the mower is ready for forward movement in a straight line, the neutral locking arm 70 is retracted and the handle bar 36 is twisted in a clockwise, (plus) direction, as seen in FIG. 4, causing both pumps 28 and 30 to stroke forward in a direction indicated by an arrow having a plus sign. Since both pumps 28 and 30 are being stroked the same angular movement, the flow rate to both drivewheels 16 and 18 is equal, causing the mower to move in a straight line. The forward speed the mower attains is based on how far handle bar 36 is twisted from its neutral stop. To stop the mower, handle 36 is twisted counterclockwise to a stop, not shown. To back up the mower, handle 36 is first moved to the right a slight distance A, long the handle's horizontal axis of rotaion, to avoid the above mentioned stop. The handle bar 36 is then twisted in a counterclockwise (minus) direction, after the neutral stop is passed which is not shown.

When it is desirous to turn the mower to the left, as seen in FIG. 4, the handle bar 36 is slightly rotated about a vertical axis, rotating steering shaft 32, in a counterclockwise direction, as indicated by arrow 59. This rotation of the handle bar 36 also rotates yoke 46 on the bottom of steering shaft 32 which strokes pump 30 in a decreasing (minus) direction, thereby reducing flow to left wheel 16 while right wheel 18 receives increasing flow from pump 28, through connecting rod 38, which causes the increased flow on the right pump 28; and decreased flow on the left pump 30 to turn the vehicle to the left. Connecting rods 38 and 40 oppositely affect motors 28 and 30 as yoke 46 is rotated on way or the the other by steering shaft 32 to which it is integrally mounted. A turn to the right is accomplished by a slight clockwise turn, as seen in FIG. 4, of the handle bar 36 which functions in the reverse manner as the left turn above described. When the operator turns locking arm 70 to its locked position, the two pumps 28 and 30 are locked in a neutral, zero flow position.

If the mower 10 is stopped at the FIG. 4 neutral position, and the handle bar 36 is turned, to rotate steering shaft 32 in a clockwise direction, pump 28 will stroke minus (backward) while pump 30 will stroke plus (forward) and both wheels will turn at the same rate in opposite directions. This is referred to as a zero radius turn (ZRT) and the mower 10 will rotate about the vertical axis 90 (FIG. 1) which is the center point on the wheel axis 91, as further shown in FIG. 2 and 3.

If the mower is moving forward when steering shaft 32 is rotated, it is possible that pump 28 will destroke to neutral wherein wheel 18 will stop and the mower will rotate about wheel 18.

Figure 6:
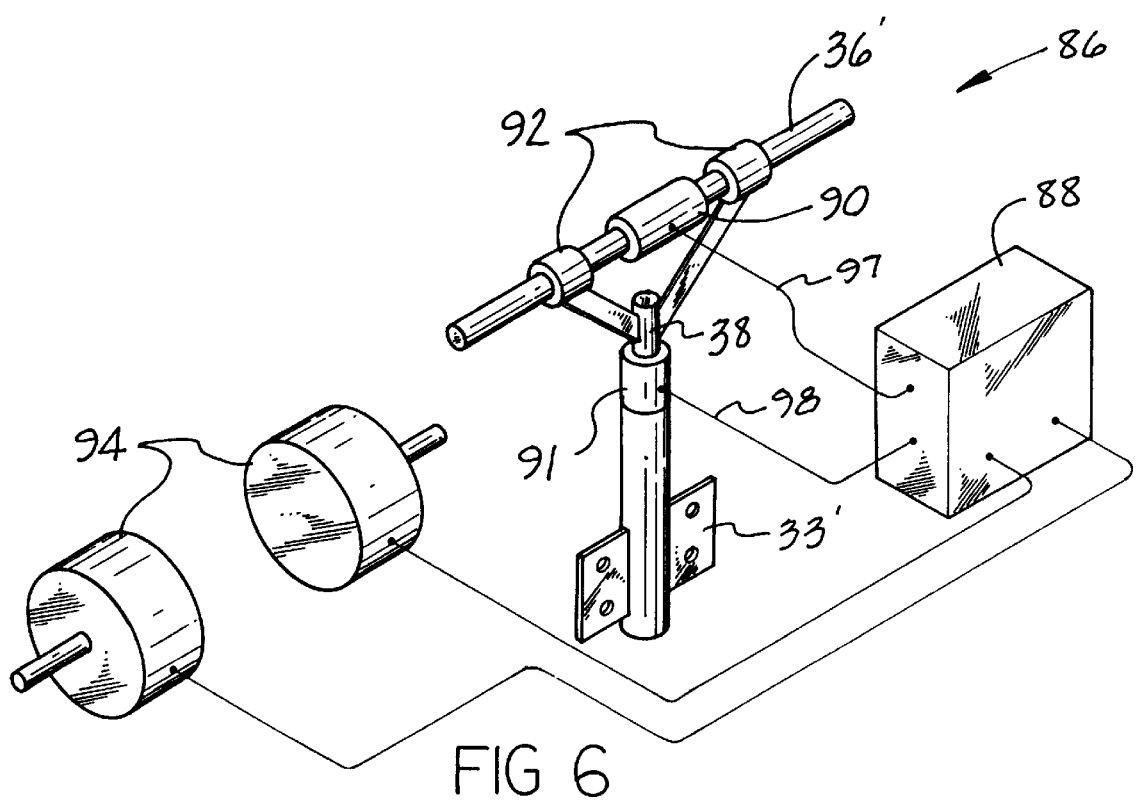
FIG. 6 is a symbolic view of the steering system on an electrically powered mower.

FIG. 6 symbolically illustrates the steering system of the present invention in a modified form on an electrically powered mower. In place of the hydraulic motors 24 are two electrical motors 94 which are powered by a controller processor 88 which includes a power source. Processor 88 electrically powers both motors at a variable speed, neutral or reverse with well known electrical technology in the art and not disclosed herewith. Positioned in handle bar 36' is a rotary motion position sensor device 90 well known in the art which when the handle bar is twisted about a horizontal axis, sends an electrical signal to processor 88 which in turn equally increases the speed of both motors 94 to move the vehicle forward or backward. Located on steering shaft 38 is a rotary motion position sensor 91 which senses the angular rotation from its straight ahead position and signals controller 88 through conductor 98 which causes controller 88 to turn the pair of motors 94 an equal speed change in an inverse proportion so that one motor 94 increases in speed while the second motor 94 decreases in speed a like amount.

In viewing FIG. 3, the height of seat 26 from the foot pad 74 where the operator rests his feet, is 27 inches or two-thirds the height of the steering handle bar 36 from the foot pad 74. In the sitting position, the operator's lower leg is tilted slightly forward and it is relatively easy for the operator to shift from a sitting to a standing position. The positioning of handle bar 36 with reference to the seat height and the foot rest is at an optimum for both a standing and a sitting operator.

From the above description of the invention, those skilled in the art will perceive the improvements, changes and modifications. Such improvements changes and modifications within the skill of the art are intended to be covered by the appended claims:

We claim:

1. A self-propelled drivewheel steering power mower capable of a zero turning radius by its operator, the mower comprising:

a frame;

an engine mounted on the frame;

a pair of variable flow hydrostatic pumps driven by said engine each having tiltable swash plates with a zero flow neutral position;

at least one cutting blade rotatably mounted on said frame driven by said engine;

first and second drivewheels each independently driveable in both forward and rearward directions at variable speeds on separate axles for driving and steering said mower;

first and second hydrolic motors mounted on said frame connected to said first and second drivewheels;

a vertically mounted steering shaft rotatably supported by a bearing on said frame for rotation about an axis concentric with said shaft;

a T-shaped steering handle bar rotatably journaled to the end of said steering shaft for rotation about an axis concentric with said handle bar;

a first pair of connecting rods connecting the lower end of the steering shaft to the swash plate of each variable flow pump whereby rotation of the steering shaft in one direction will increase the flow rate to one of the following variable flow pumps while decreasing the flow rate proportionately to the other variable flow pump; and a second connecting rod connection the steering handle bar to said first pair of connecting rods whereby rotation of the T-shaped handle bar in the direction increases the flow rate proportionallyto both variable flow pumps while rotation in the opposite direction decreases thr flow rate proportionally to both variable flow pumps.

2. A self-propelled drivewheel steering power mower, as set forth in claim 1, including a driver presence circuit which included a seat pad switch which closes when there is weight on the seat, connected in parallel with a foot pad switch which closes when there is weight on the foot pad, which circuit cuts electrical power and stops the engine whenever both of said switches are open.

3. A self-propelled drivewheel steering power mower, as set forth in claim 2, further including a second foot pad switch connected in parallel with both the seat pad switch and the first foot pad switch, whereby closure of any of the three switches allow the engine to continue running.

4. A self-propelled power mower, as set forth in claim 1, wherein the first and second motors included drive shafts which were concentrically positioned with their respective wheel axles in driving relation.

5. A self propelled power mower, as set forth in claim 1, including a yoke member pivotally connected to the bottom of said steering shaft, said yoke including a first ear projecting on one side of said steering shaft and pivotally connected to one of said first pair of connecting rods, and a second and third ear on said yoke on opposite sides of the steering shaft from said first ear, said second ear being pivotally attached to the second connecting rod of said first pair, and said third ear being pivotally connected to said second connecting rod.

6. A self-propelled power mower, as set forth in claim 1, wherein said T-shaped handle bar includes an enlarged diameter sleeve fixed to said steering shaft having a bearing mounted at each end of the sleeve for rotatable support of said handle bar, said sleeve further including an opening therein for passage of said second connecting rod to said steering handle bar.

7. A self-propelled drivewheel steering power mower capable of a zero turning radius by its operator, the mower comprising:

a frame;

an engine mounted on the frame;

a pair of variable flow hydrostic pumps driven by said engine each have tiltable swash plates with a zero flow neutral position;

at least one cutting blade rotably mounted on said frame driven by said engine;

first and second drivewheels each independently driveable in both forward and rearward directions at variable speeds on separate axles for driving and steering said mower;

first and second hydrolic motors mounted on said frame connected to said first and second drivewheels, respectively;

a vertically mounted steering shaft rotatably supported by a bearing on said frame for rotation about an axis concentric with said shaft;

a T-shaped steering handle bar rotatably journaled to the end of said steering shaft for rotation about an axis concentric with said handle bar;

a first means connecting the rotational movement of the steering shaft to the pair of swash plates of the variable displacement pumps to inversely vary flow rate from the two pumps and drive the drivewheels at different speeds and/or directions to steer the mower; and a second means connection the rotational movement of the handle bar to swash plates of the variable displacement pumps to increase or decrease the speed of the mower.

8. A self-propelled power mower as set forth in claim 7 wherein the mower includes a seat for a sitting operator and a foot pad for a standing operator, the height of the seat above the foot pad is greater than two-thirds the height of the foot pad to the T-shaped handle bar.

9. A self-propelled drivewheel steering power mower, the mower comprising:

a frame;

a power source on the frame;

at least one cutting blade driven by said power source;

first and second drivewheels each independently driveable in both forward and rearward directions at variable speeds for driving and steering said mower;

first and second variable speed motors connected to said first and second drivewheels;

a vertically mounted steering shaft rotatably supported by a bearing on said frame for rotation about an axis concentric with said shaft;

a T-shaped steering handle bar rotatably journaled to the end of said steering shaft for rotation about an axis concentric with said handle bar;

a first rotary motion position sensor on said handle bar which produces a signal for the position of said handle bar;

a second rotary motion position sensor on said steering shaft which produces a signal for the position of said steering shaft; and a processor which separately powers both motors, the processor receiving signals from the first and second rotary motion position sensors, and provides the necessary current to the respective motors to vary the motor speed and/or direction in accordance with the position of said handle bar and said steering shaft to steer and drive the power mower.

* * * * *